(12) United States Patent
    Crain (10) Patent No.: US 11,154,772 B2
(45) Date of Patent: Oct. 26, 2021

(54) HANDHELD CONTROLLER GRIP ATTACHMENT

(71) Applicant: The Bearded Bear, LLC, Greeley, CO (US)

(72) Inventor: Joel M. Crain, Greeley, CO (US)

(73) Assignee: The Bearded Bear, LLC, Greeley, CO (US)

( * ) Notice: Subject to any disclaimer, the term of this patent is extended or adjusted under 35 U.S.C. 154(b) by 0 days.

(21) Appl. No.: 15/396,588

(22) Filed: Dec. 31, 2016

(65) Prior Publication Data

US 2017/0189800 A1    Jul. 6, 2017

Related U.S. Application Data

(60) Provisional application No. 62/274,001, filed on Dec. 31, 2015.

(51) Int. Cl.
  *A63F 9/24*   (2006.01)
  *A63F 13/00*   (2014.01)
  *G07F 17/00*   (2006.01)
  *G07F 19/00*   (2006.01)
  *A63F 13/24*   (2014.01)
  *A63F 13/98*   (2014.01)

(52) U.S. Cl.
  CPC .............. *A63F 13/24* (2014.09); *A63F 13/98* (2014.09)

(58) Field of Classification Search
  CPC ......... A63F 13/23; A63F 13/24; A63F 13/245
  See application file for complete search history.

(56) References Cited

U.S. PATENT DOCUMENTS

| 5,820,462 A * | 10/1998 | Yokoi | A63F 13/06 |
| | | | 463/37 |
| 5,923,317 A | 7/1999 | Sayler et al. | |
| 6,811,491 B1 * | 11/2004 | Levenberg | A63F 13/02 |
| | | | 273/148 B |
| 6,923,443 B1 | 8/2005 | Hughes | |
| 7,927,216 B2 * | 4/2011 | Ikeda | A63F 13/06 |
| | | | 463/37 |
| 8,568,233 B2 | 10/2013 | Block | |
| 8,740,708 B2 | 6/2014 | Karacal et al. | |

(Continued)

FOREIGN PATENT DOCUMENTS

WO   WO/2007/040499   12/2007

*Primary Examiner* — Milap Shah
*Assistant Examiner* — Jason Pinheiro (57) ABSTRACT

Embodiments of the present disclosure include a grip attachment that changes the shape of a handheld controller, allowing individual users to comfortably hold the controller while they interact with the controlled system. For example, some embodiments include a video game controller grip attachment having features that conform to fit securely with the video game controller, allow the user to hold the video game controller, and/or enable a user to grip a handheld controller in different configurations. In other embodiments, the grip for interfacing with one hand (e.g., the right hand) may be different than the grip for interfacing with the other hand (e.g., the left hand). In some embodiments, the grip has a palm swell element including a controller interface surface configured to at least partially accommodate a back surface of a handheld controller, and/or an outer surface extending an overall depth of the palm area of the handheld controller.

14 Claims, 5 Drawing Sheets

(56) References Cited

U.S. PATENT DOCUMENTS

| | | | |
|---|---|---|---|
| 8,894,490 B2* | 11/2014 | Brandt | A61F 13/06 463/3 |
| 2005/0075172 A1* | 4/2005 | Coleman | A63F 13/02 463/47 |
| 2007/0045951 A1 | 3/2007 | Robertson | |
| 2008/0015017 A1* | 1/2008 | Ashida | A63F 13/02 463/37 |
| 2009/0093307 A1* | 4/2009 | Miyaki | A63F 13/06 463/37 |
| 2011/0306424 A1* | 12/2011 | Kazama | A63F 13/245 463/37 |
| 2012/0302348 A1* | 11/2012 | Karacal | A63F 13/837 463/38 |
| 2014/0200085 A1* | 7/2014 | Bares | A63F 13/98 463/47 |
| 2016/0023048 A1 | 1/2016 | Feldstein | |

* cited by examiner

HANDHELD CONTROLLER GRIP ATTACHMENT

CROSS REFERENCE

This application claims the benefit of U.S. Provisional Patent Application No. 62/274,001, filed on Dec. 31, 2015, which is incorporated by reference herein in its entirety for all purposes.

TECHNICAL FIELD

The present disclosure relates to grip attachments for handheld controllers.

BACKGROUND

Handheld controllers generally encompass a range of different devices such as video game controllers, TV remote controllers, smart-phones, tablets and other control devices held by a user. For example, video game controllers allow a user to interact with a video game system. Handheld video game controllers allow a user to hold the video game controller in the user's hand and move the controller as desired by the user. In some instances, the controller may remotely interface with the video game system, while in others the handheld controller and game system may be integrated. Typical handheld controllers comprise a housing which contains the controls and other components for interacting with a video game system. However, handheld controllers generally only come in a single shape and size and therefore often do not conform to the size of a user's hands and often do not help facilitate a user gripping the controller in different arrangements. Thus, standard "one-size-fits-all" handheld controllers can in some instances lead to user discomfort or unease.

BRIEF SUMMARY

Among other things, embodiments of the present disclosure include a grip attachment that changes the shape of a handheld controller, allowing individual users to comfortably hold the controller while they interact with the controlled system, such as a video game system. For example, some embodiments include a video game controller grip attachment having features that conform to fit securely with the video game controller, features that comfortably allow the user to hold the video game controller (e.g., the grip attachment increasing the size of the palm swell for users with larger hands), and/or structures that enable a user to grip a handheld controller in different configurations. In other embodiments, the grip for interfacing with one hand (e.g., the right hand) may be different than the grip for interfacing with the other hand (e.g., the left hand). In some embodiments, the grip has a palm swell element including a controller interface surface. The controller interface surface is configured to at least partially accommodate a back surface of a handheld controller. The palm swell element may also have an outer surface which extends from the handheld controller interface surface in a direction opposite from a front surface of the handheld controller.

According to one embodiment, the grip has an attachment element coupled to the palm swell element. The attachment element has a top attachment member and a bottom attachment member. The top attachment member is configured to a least partially accommodate a top surface of the handheld controller and culminate around the juncture between the front surface and the top surface of the handheld controller. The bottom attachment member is configured to at least partially accommodate a bottom surface of the handheld controller and culminate around the juncture between the front surface and the bottom surface of the handheld controller.

According to another embodiment, the attachment element is configured to detachably secure the grip to the handheld controller through frictional and/or clamping forces between the attachment member and the front, top, and bottom sides of the handheld controller.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

BRIEF DESCRIPTION OF THE DRAWINGS

The accompanying figures illustrate one or more embodiments of the disclosed handheld controller grip attachment, and together with the detailed description serve to explain the aspects and implementations of the handheld controller grip attachment. Embodiments are described in conjunction with the appended figures.

While embodiments of the disclosure are amenable to various modifications and alternative forms, specific embodiments have been shown by way of example in the drawings and are described in detail below. The intention, however, is not to limit the scope of the disclosure to the particular embodiments described. On the contrary, the disclosure is intended to cover all modifications, equivalents, and alternatives falling within the scope of the disclosure and the appended claims.

DETAILED DESCRIPTION

All illustrations of the drawings are for the purpose of describing selected embodiments and are not intended to limit the scope of the claims. The following specification describes a handheld controller and a grip attachment for such controllers.

The handheld controller grip attachment ("grip") 101 may be made from a plastic composite, rubber composite, metal, another ceramic, or another composite, and/or other materials, or a combination of two or more such materials. The grip 101 wraps around and clamps upon the top and bottom of the handheld controller 201. The material of the grip 101 possesses a density to promote dexterity so as to firmly, yet detachably, retain the grip 101 to the handheld controller 201. The size of the grip 101 is designed to fill a user's hands, for example to fill a palm of a user's hand, so as to provide for a more comfortable user experience.

The handheld controller 201 may be any type of controller that provides input to entertainment systems. For example, the controller 201 may be a Super Nintendo Entertainment System® game controller, a Microsoft Xbox® game controller, or other similar handheld controllers. In one embodiment, the handheld controller 201 has a front surface 203, a back surface 205, a top surface 207, a bottom surface 209, and may have two side surfaces. Some handheld controllers 201 include user inputs, which may be located on the front surface 203, although a controller 201 in some embodiments includes user inputs on the top surface 207. Other embodiments of controllers 201 may include user inputs upon other surfaces. Examples of user inputs include buttons, directional pads, analog sticks, joy sticks, and touch screens. The back surface 205 is located opposite the front surface 203. The top surface 207 may contain user inputs such as shoulder triggers. Shoulder triggers are buttons which mimic triggers on real-life firearms. Other user inputs may be located on the top surface as well. The bottom surface 209 is located opposite the top surface 207.

Figure 1:
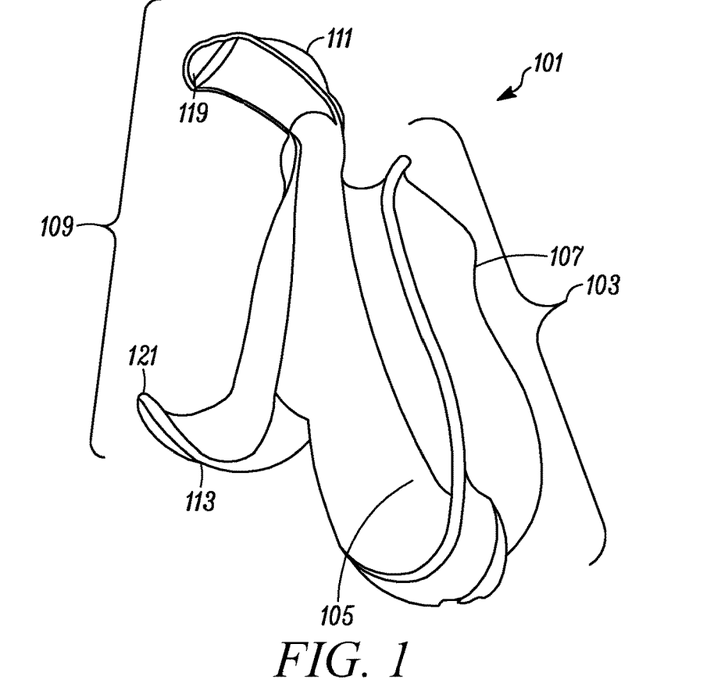
FIG. 1 shows a first perspective view of the handheld controller grip attachment.
Figure 2:
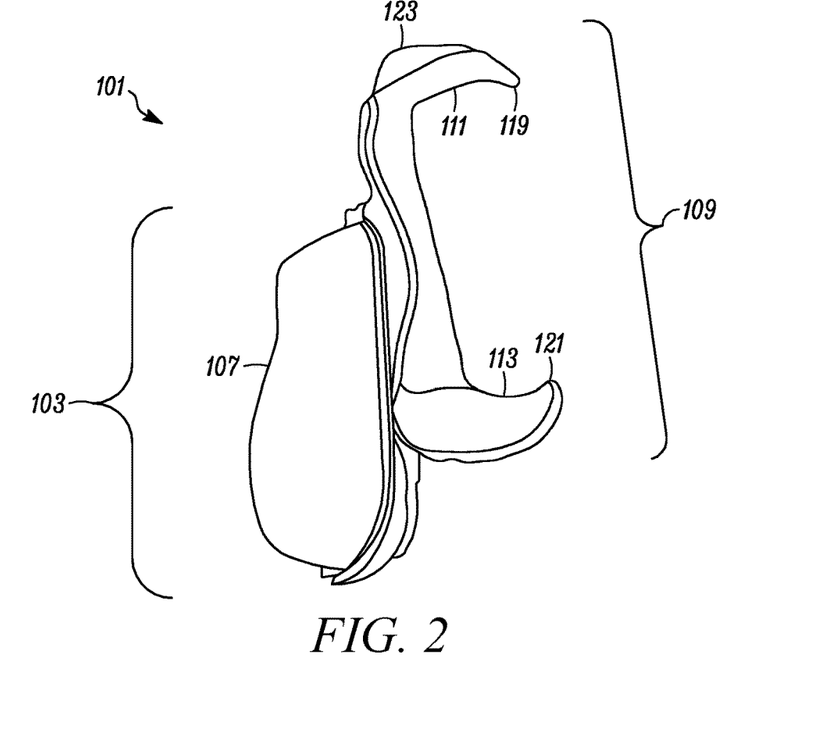
FIG. 2 shows a second perspective view of the handheld controller grip attachment.
Figure 3:
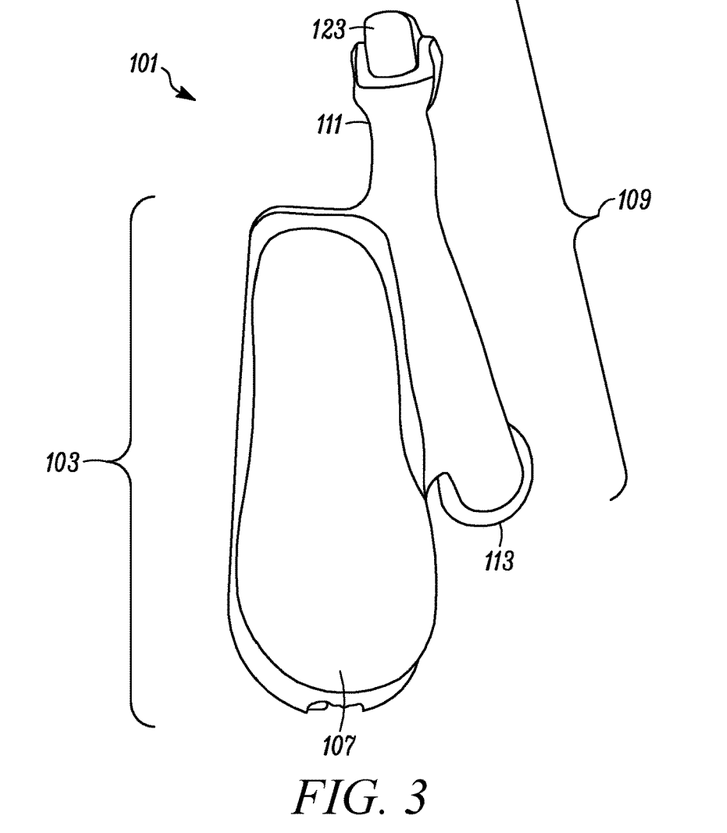
FIG. 3 shows a third perspective view of the handheld controller grip attachment.

FIG. 1-3 show multiple views of one embodiment of a handheld controller grip attachment 101, which may also be referred to as grip 101. The grip 101 includes two elements: a palm swell element 103, which may also be referred to as palm swell 103, and an attachment element 109 coupled to the palm swell element. The palm swell 103 and attachment element 109 are coupled to one another, according to some embodiments. As used herein, the term "coupled" is used in its broadest sense to refer to two or more items, elements, and/or features that are joined, attached, fastened, connected, formed integrally, formed unitarily, formed monolithically, and/or otherwise attached, directly or indirectly. In some embodiments, the palm swell 103 and attachment element 109 are one piece or coupled to each other by glue, epoxy, snap-fit, bolt, screw, string, or other fastening means. The palm swell 103 includes a handheld controller interface surface 105 and an outer surface 107. In one embodiment, the handheld controller interface surface 105 accommodates the area 211 on the back surface 205 of the controller against which a user's hands are typically placed during use of the controller 201. This area 211 may have elements which extend out to engage the user's palms with curved edges such as in a Microsoft XBox® game controller as depicted in FIG. 1. This area 211 may be substantially flat with more sharply defined edges such as in the Super Nintendo Entertainment System® game controller. This area 211 may have a variety of shapes and sizes to which the handheld controller interface surface 105 may be shaped to accommodate. The outer surface 107 extends away from the back surface in a direction opposite the front surface 203 of the handheld controller 201 to engage the user's palm. The palm swell 103 is formed with an ergonomic shape for improved user comfort and feel, especially for those users with larger than average hand sizes.

The attachment element 109 includes a top attachment member 111 and a bottom attachment member 113, according to some embodiments of the present disclosure. The two attachment members 111, 113 are shaped to wrap around and clamp upon the top and bottom surfaces 207, 209 of the handheld controller 201. The two attachment members 111, 113 do not wrap completely around the front surface 203 so as to engage each other, but instead have two respective points of culmination 119, 121. The top attachment member 111 culminates on or around the juncture 210a between the top surface 207 and the front surface 203 of the handheld controller 201 when the attachment element 109 is releasably coupled with the controller 201. The bottom attachment member 113 culminates on or around the juncture 210b between the bottom surface 207 and the front surface 203 of the handheld controller 201. The attachment element 109 is shaped or configured to firmly, yet detachably, retain the grip 101 to the handheld controller 201.

In one embodiment, the top attachment member 111 may contain a finger rest 123. The finger rest 123 is shaped to accommodate a user's index finger, middle finger, and/or or other fingers when the grip 101 is attached to the handheld controller 201. In some embodiments, the finger rest 123 serves as a soft and ergonomic resting place for a user's finger or fingers. The finger rest 123 may additionally or alternatively provide a more advantageous angle for a user's fingers to engage the user inputs. When a user places the user's index finger or other fingers on the finger rest 123, the rest of the user's hands are moved slightly up and away from the front surface 203 and toward the center of the handheld controller. A higher and more centralized position of a user's fingers over the user inputs allows for quicker and more precise utilization of the user inputs. The finger rest 123 may additionally or alternatively provide a base from which alternate user hand positions can be employed. For example, some users prefer a "claw" style of gripping the handheld controller 201. In this "claw" style, the user's thumb and index finger rest upon or hover over the front surface 203 of the handheld controller 201 and the user's middle finger rests upon or hovers over the top surface 207 of the handheld controller 201. The presence of the finger rest 123 according to some embodiments allows the user to rest the user's middle finger upon a relatively higher surface to provide greater leverage to the user's index finger and thumb.

Figure 4:
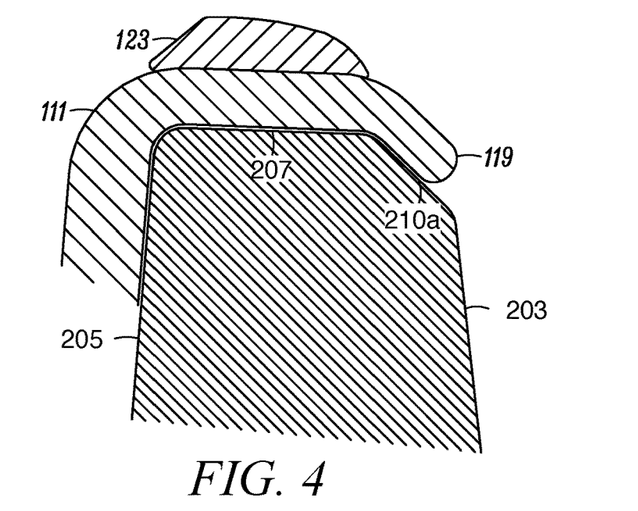
FIG. 4 shows a side, cross-sectional view of the system comprising the handheld controller and the handheld controller grip attachment.

FIG. 4. is a cross-sectional view of the top attachment member 111 when engaged with the handheld controller 201. As illustrated and described above with respect to FIGS. 1-3, the top attachment member 111 is shaped or configured so as to wrap around the top surface 207 of the handheld controller 201. The top attachment member 111 has a point of culmination 119 which contacts on or near the juncture 210a between the top surface 207 and the front surface 203 of the handheld controller 201. In a similar manner, the bottom attachment member 113 is shaped or configured so as to wrap around the bottom surface 209 of the handheld controller 201. The bottom attachment member 113 has a point of culmination 121 which contacts on or near the juncture 210b between the bottom surface 209 and the front surface 203 of the handheld controller 201. The points of culmination 119, 121 may culminate slightly before or slightly after the juncture 210a or 210b depending upon the configuration of the handheld controller—for example, the point of culmination 119 in some embodiments extends further from the top attachment member 111 than shown in FIG. 4 or beyond the juncture 210b as shown in FIG. 4, and in other embodiments the point of culmination 119 does not extend as far from the top attachment member 111 as shown in FIG. 4. Such a juncture 210a or 210b may be curved, slanted, at a sharp ninety degree angle or the like, or some other configuration. In some embodiments, such a juncture 210a or 210b may also have an integrated ridge or other embedded structure.

The attachment element 109 is shaped to detachably secure the grip 101 to the handheld controller 201 by clamping forces between the top and bottom attachment members 111, 113 and the top and bottom surfaces 207, 209 of the handheld controller 201. To attach the grip 101 to the handheld controller 201 a user presses the attachment element 109 against the back surface 205 of the handheld controller 201. The top attachment member 111 and the bottom attachment member 113 will expand over the top and bottom surfaces 207, 209 of the handheld controller 201. When the attachment members 111, 113 move past the top and bottom surfaces 207, 209 of the handheld controller 201, the attachment members 111, 113 will contract back toward their original shape until the culmination points 119, 121 contact on or near their respective junctures 210a or 210b between the front surface 203 and top and bottom surfaces 207, 209. The grip 101 is secured to the handheld controller 201 when the top and bottom attachment members 111, 113 are simultaneously engaged with their respective junctures 210a or 210b. In some embodiments, the attachment element 109 will make a snap or click sound when engaging with the junctures 210a or 210b. The grip 101 is also secured to the handheld controller 201 by frictional forces between top attachment member 111 and the top surface 207 and the bottom attachment member 113 and the bottom surface 209. The grip 101 is also secured by normal forces between the points of culmination 119, 121 of the top and bottom attachment members 111, 113 and the front surface 203.

The grip 101 can also be attached to the handheld controller 201 with the benefit of a mechanical hinge or joint (not shown) included in either or both of the top and bottom attachment members 111, 113. Such a mechanical hinge or joint has the properties similar to a door hinge or an elbow joint, according to one embodiment. The mechanical hinge or joint has an open configuration and a closed configuration. A user may detachably retain the grip 101 to the handheld controller 201 by pressing the attachment element 109 against back surface 205 of the handheld controller 201 with one or more mechanical hinges or joints in the open configuration. The user may then move the one or more mechanical hinges or joints into the closed configuration around the top and or bottom surfaces 207, 209 of the handheld controller 201. The mechanical hinge or joint may have any one of a number of hinges or joints such as a spring hinge, barrel hinge, pivot hinge, case hinge, butterfly hinges, or the like.

Figure 5:
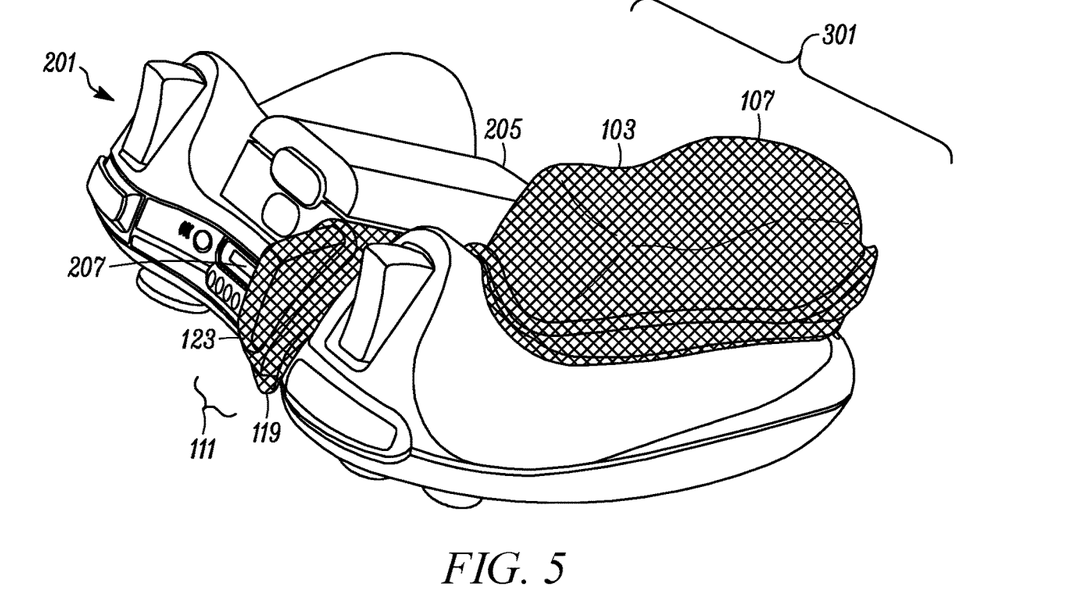
FIG. 5 shows a first perspective view of the system comprising the handheld controller and the handheld controller grip attachment.
Figure 6:
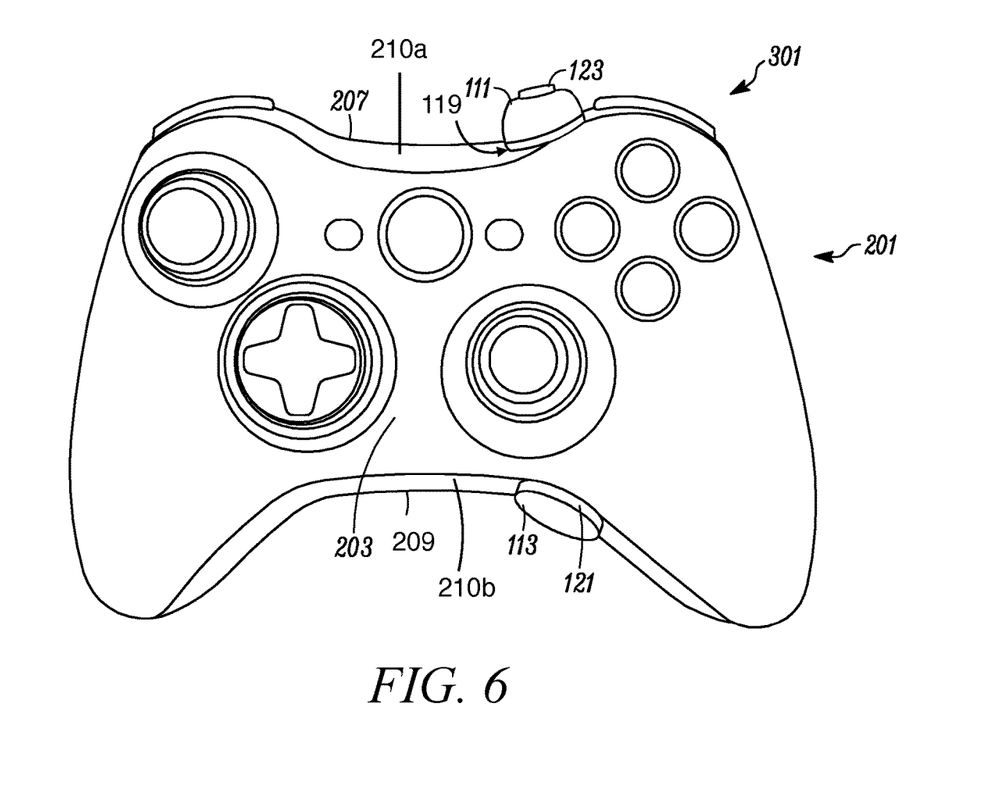
FIG. 6 shows a second perspective view of the system comprising the handheld controller and the handheld controller grip attachment.
Figure 7:
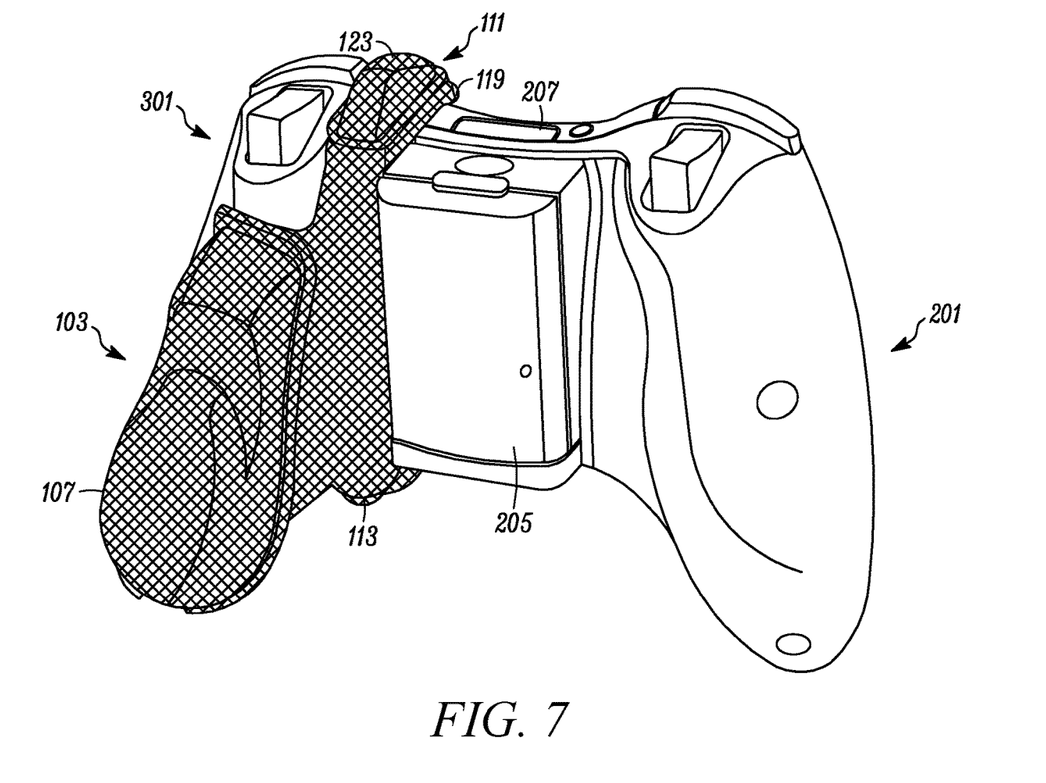
FIG. 7 shows a third perspective view of the system comprising the handheld controller and the handheld controller grip attachment.
Figure 8:
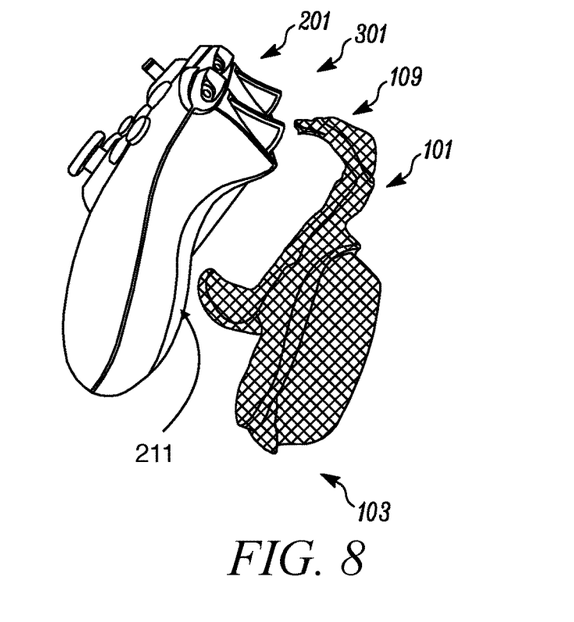
FIG. 8 shows a fourth perspective view of the system comprising the handheld controller and the handheld controller grip attachment.
Figure 9:
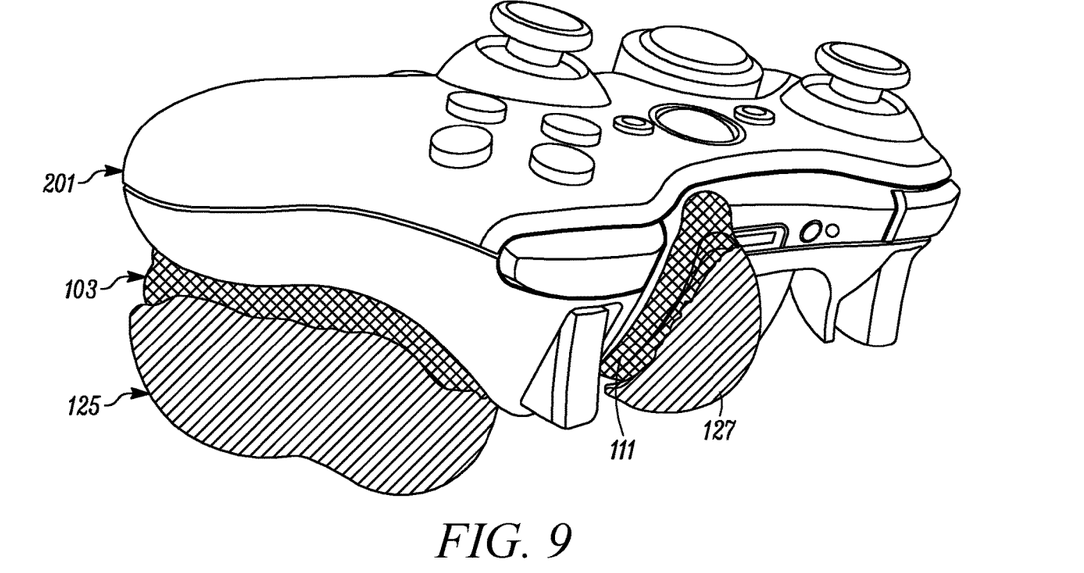
FIG. 9 shows a perspective view of the system comprising the handheld controller, the handheld controller grip attachment, and the handheld controller grip attachment sleeves.

FIGS. 5-7. show multiple views of the grip and handheld controller system 301. FIG. 5. Shows a side view of the system 301. FIG. 6. shows a front surface view of the system 301. FIG. 7. shows a back surface view of the system. FIG. 8. shows an exploded view of the grip and handheld controller system 301. FIG. 9 shows the grip and handheld controller system 301 including grip sleeves 125. The grip sleeves 125 attach to the outer surface 107 and the top attachment element 111 or finger rest 127. The grip sleeves 125 increase ergonomic comfort and feel, increase grip, and/or decrease the negative effects of perspiration accumulation, according to some embodiments of the present disclosure. The grip sleeves 125 may be removably or irremovably coupled with or affixed to the grip 101 via epoxy, glue, or other attachment mechanisms. The grip sleeves 125 may be made of rubber, rubber composite, leather, or other material. The grip sleeves 125 may be customized to a user's preference based on surface texture, color, size, sleeve depth, and/or sleeve material, in some embodiments. The grip sleeves 125 may be made of a material which molds to a user's hands. The grip 101 or grip sleeves 125 may include aesthetic designs or branding such as a user's name or favorite sports team.

Figure 10:
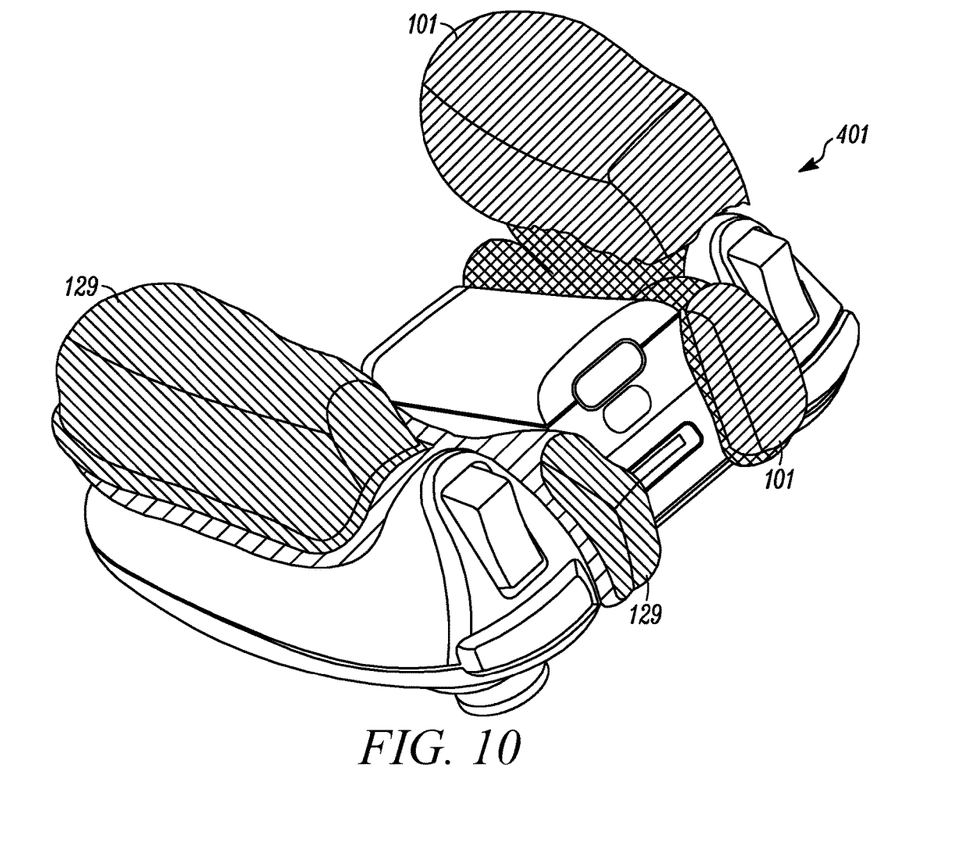
FIG. 10 shows a perspective view of the system comprising the handheld controller, the handheld controller grip attachment, the handheld controller grip sleeves, and an additional handheld controller grip attachment.

FIG. 10 shows a second handheld controller and grip attachment system 401 including a grip 101, handheld controller 201, and additional handheld controller grip attachment 129, which may also be referred to as additional grip 129. The additional grip 129 is substantially similar to the grip 101. The additional grip 129 mirrors the grip 101 so to attach to the other side of the handheld controller 129. The additional grip 129 may contain a finger rest, grip sleeves, or other grip accessories specified for the grip 101. The additional grip 129 may be the same size or a different size from the grip 101. The grip 101 and additional grip 129 may be connected to each other. This connection may be integral to both the grip 101 and the additional grip 129 so that they are manufactured as one piece. This connection may be made of the same material as the grip 101 and additional grip 129 or of a different material. The connection may be electrical. The additional grip 129 may include any of, or any combination of, the structures, shapes, features, and/or characteristics described with respect to grip 101, according to embodiments of the present disclosure. According to some embodiments of the present disclosure, the shape and/or depth of the palm swell of grip 101 is different from the shape and/or depth of the palm swell of grip 129 on the same controller, permitting the user to customize the ergonomics and tactile experience with the controller as between the user's left palm and right palm.

The grip 101 may be manufactured with an electronic connection to the handheld controller 201. The grip 101 may also include a processor. The processor may include or be part of or form a computer or computer chip. The electronic connection and processor can be used to convert battery power from the handheld controller 201 to the grip 101, to receive signals from the handheld controller 201 or accompanying game console, or to send signals from the grip 101 to the handheld controller 201 or accompanying game console. The grip 101 may also contain its own battery. The grip battery may be rechargeable.

The power converted from the handheld controller 201 or game console to the grip 101 through the electronic connection or from the grip's 101 own battery may be used to power electronics, such as lights or rumble packs or other haptic feedback or user interface devices, within the grip 101. The grip 101 may be made of translucent material so that LED imbedded within the grip 101 can shine though. The grip battery may be used as a back-up power source for the handheld controller 201.

The processor may be used in conjunction with a game console. Certain actions within a game may trigger certain lights or rumble packs within the grip. For example, if an enemy in a game is located on the right side of a user, then a rumble pack on the right grip will activate. The processor may also have the capability to store memory. This may be memory specific to a certain game, memory for general information about the user such as a user avatar or a user's login data, or memory for some other type of data. A user may take such customized grips to different locations, such as a neighbor's house, and play video games with the user's own unique information at their disposal.

The processor may be used in conjunction with wireless technology such as Bluetooth® or Wi-Fi®. This wireless technology could be used to communicate data, such as sound data, from the grip 101 to the handheld controller 201, game console, television, headphones, or other device capable of wireless communication.

The grip 101 may include additional user inputs. For example, there may be an additional button or buttons on the finger rest 125. The processor may be used to reprogram the handheld controller 201 to a user's preference. A user may turn off certain user inputs on the handheld controller 201 and replace their functionality with a user input located on the grip 101. This may be beneficial to users with unique gripping techniques. These additional user inputs may also be programmable for in-game functionality without the need to turn off user inputs located on the handheld controller 201.

Among other things, embodiments of the present disclosure include a system 301 comprising a grip 101 for a handheld controller 201. The grip 101 comprises a palm swell element 103. This palm swell element 103 additionally comprises a handheld controller interface surface 105 that is configured to at least partially accommodate a back surface 205 of the handheld controller 201. The palm swell element 103 also comprises an outer surface 107 which extends from the handheld controller interface surface 105 in a direction opposite from a front surface 203 of the handheld controller 201. The grip 101 also comprises an attachment element 109 coupled to the palm swell element 103. The attachment element 109 has a top attachment member 111 and a bottom attachment member 113. The top attachment member 111 is configured to at least partially accommodate a top surface 207 of the handheld controller 201 and to culminate 119 around the juncture 210a between the front surface 203 and the top surface 207 of the handheld controller 201. The bottom attachment member 113 is configured to at least partially accommodate a bottom surface 209 of the handheld controller 201 and to culminate 121 around the juncture 210b between the front surface 203 and the bottom surface 209 of the handheld controller 201. The attachment element 109 is also configured to detachably secure the grip 101 to the handheld controller 201 through frictional and clamping forces between the top and bottom attachment members 111, 113 and the front, top, and bottom sides 203, 207, 209 of the handheld controller 201.

The system 301 may further comprise a finger rest 123 located on the top attachment member 111. The system 301 may further comprise a second grip 129 having a shape that is translationally symmetrical with the first grip 101. The first and second grip 101, 129 may be coupled to one another. The system 301 may further comprise a moveable joint or hinge. The system 301 may further comprise a sleeve 125 shaped to fit over and interface with the outer surface 107. The system 301 my further comprise a sleeve 125 shaped to fit over and interface with the top attachment member 111 or finger rest 123.

Another embodiment of system 301 comprises the grip 101 which is secured to the handheld controller 201 by means of pressing the grip 101 against the back surface 205. The attachment element 109 will then expand around the top and bottom surfaces 207, 209 of the handheld controller 201. The attachment element 109 will then retract to, or near to, the attachment element's 109 original shape when the top attachment member 111 and the bottom attachment member 113 culminate 119, 121 respectively around the junctures 210a or 210b between the front surface 203 and the top surface 207 and the front surface 203 and the bottom surface 209 of the handheld controller 201.

Another embodiment comprises a method for making a grip 101 for a handheld controller 201. This method involves injection molding the grip 101 for a handheld controller 201 as described above.

Another embodiment of system 301 comprises a handheld controller 201 which has a front 203 with at least one front control button, a top 205 with at least one top control button, a controller palm swell 211, a top tapered area 210a where the front 203 transitions to the top 207, and a bottom tapered area 210b where the front 203 transitions to the bottom 209. The system 301 further comprises a grip 101 removably coupled with the handheld controller 201. The grip 101 has a grip palm swell 103 and an attachment element 109. The grip palm swell 103 is configured to cover at least a portion of the controller palm swell 211 and extends the overall depth of the controller palm swell 211 when the grip 101 is removably coupled with the handheld controller 201. The attachment element 109 comprises a top attachment member 111 and a bottom attachment member 113. The top attachment member 111 engages the top tapered area 210a and the bottom attachment member 113 engages the bottom tapered area 210b in a snap fit engagement when the grip 101 is removably coupled to the handheld controller 201.

In another embodiment, the top tapered area 210a is a ledge. In another embodiment, no portion of the attachment element 109 extends entirely across the front 203 from top 207 to bottom 209 or bottom 209 to top 207. In another embodiment, the grip 101 further comprises a finger rest ledge 123 located at the top when the grip 101 is removably coupled with the handheld controller 201. In another embodiment, the grip palm swell 103 includes an inside surface 105 with a shape that substantially conforms to at least a portion of the controller palm swell 211 shape when the grip 101 is removably coupled to the handheld controller 201. In another embodiment, the attachment element 109 is C shaped. In another embodiment, the firmness of the snap fit engagement of the attachment element 109 with the handheld controller 201 is imparted by elasticity properties of the attachment element 109. In another embodiment, the outer surface 107 of the grip palm swell 103 includes an overall curvature that generally follows the curvature of a user's palm when the palm is in a cupped or curled configuration. In another embodiment, the an outer surface 107 of the grip palm swell 103 includes a continuous curvature without acute edges or any sharp edges that might cause discomfort to the user's palm.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. A system comprising a first grip for a handheld controller and a second grip for the handheld controller, each of the first grip and the second grip comprising:
   a palm swell element, wherein the palm swell element comprises:

a handheld controller interface surface that is configured to at least partially accommodate a back surface of the handheld controller; and an outer surface which extends from the handheld controller interface surface in a direction opposite from a front surface of the handheld controller, and an attachment element including a top attachment member and a bottom attachment member, wherein the top attachment member and the bottom attachment member comprise a rigid material and at least partially define a C-shaped profile that matches a profile of the handheld controller;

the top attachment member is configured to at least partially accommodate a top surface of the handheld controller and defines a first culmination that terminates at a juncture between a top surface and a front surface of the handheld controller;

the top attachment member comprises a finger rest that defines a surface farther from the top surface of the handheld controller than user inputs of the handheld controller, wherein the finger rest is configured to be positioned between the first and second palm swell elements when the second grip is attached;

the bottom attachment member is configured to at least partially accommodate a bottom surface of the handheld controller and defines a second culmination that terminates at a juncture between the front surface and the bottom surface of the handheld controller;

the attachment element is configured to deform from the C-shaped profile while the grip is being attached to the controller and contracts substantially to the C-shaped profile such that the top and bottom attachment member create a snap fit connection to the handheld controller; and the attachment element is coupled to the palm swell element, the palm swell element is at least partially offset from the attachment element.

2. The system of claim 1, further comprising the handheld controller.

3. The system of claim 1, where the first grip and the second grip are coupled to one another.

4. The system of claim 1, wherein the top attachment member of the first grip comprises a moveable joint or hinge.

5. The system of claim 1, further comprising a sleeve shaped to fit over and interface with the outer surface of the first grip.

6. The system of claim 1, further comprising a sleeve shaped to fit over and interface with the finger rest.

7. The system of claim 1, wherein the attachment element is made from a dense material.

8. The system of claim 1, further comprising a means of coupling the first grip to the handheld controller.

9. The system of claim 1, wherein the top attachment member of the first grip, the bottom attachment member of the first grip, and the palm swell element of the first grip are formed as a single piece.

10. The system of claim 1, wherein the palm swell element and the attachment element of the first grip are formed as a monolithic piece.

11. The system of claim 1, wherein the attachment element of the first grip is an inseparable single piece.

12. The system of claim 1, wherein the front surface of the handheld controller includes controller buttons.

13. The system of claim 1, wherein the outer surface of the first grip is shaped to be held in a hand of a user.

14. The system of claim 1, wherein the finger rest is shaped to accommodate a user's finger.

* * * * *